Jan. 15, 1957 M. P. MATTHEW 2,777,637

SHAFT REVOLUTION COUNTER

Filed Feb. 27, 1956

INVENTOR.
MORTON P. MATTHEW
BY
Seymour M. Rosenberg
ATTORNEY

United States Patent Office 2,777,637
Patented Jan. 15, 1957

2,777,637

SHAFT REVOLUTION COUNTER

Morton P. Matthew, Takoma Park, Md., assignor to The Ahrendt Instrument Company, College Park, Md.

Application February 27, 1956, Serial No. 567,982

9 Claims. (Cl. 235—103)

This invention relates to a shaft revolution counter, and more specifically to a mechanical shaft revolution counter which is operative to visually present a numerical display corresponding to the position of a shaft, the display being presented through a window in a knob which is connected directly to the shaft whose rotational position is being measured.

It is frequently necessary to know the rotational position of an instrument shaft or the like which is rotatable through limits which encompass a number of shaft revolutions. For example, when a multiturn potentiometer is employed in an electrical equipment, it is often necessary to be able to preset the potentiometer at a preselected rotational position. Moreover, where a number of control elements are situated in close proximity on a complex instrument panel it is essential that the visual display presented for indicating the rotational position of a particular shaft be properly associated with that one shaft only.

In the prior art several different forms of shaft revolution counters have been developed for solving the foregoing problem, the most successful of these devices being those which present the visual display through the knob which is used for turning the shaft. However, all of these devices are inherently limited by an extremely important factor, namely, the knob is indirectly coupled to the shaft through either a gear train or a pulley and belt system. Consequently there is often backlash between the knob and its associated shaft, in the case of gears, or slippage between the shaft and knob in the case of pulley systems. Although each of these disadvantages contributes errors in setting the associated shaft to any preselected position, an equally significant factor is that the "feel" of the shaft is not transmitted to the knob so that the proper setting may be difficult to achieve, and in some instances, damage may be done inadvertently to the instrument by attempting to turn the instrument shaft past its limiting stops.

The present invention overcomes the above and other disadvantages of the prior art devices by providing a shaft revolution counter wherein the knob is rigidly affixed directly to the shaft but which nevertheless presents a stable visual display of the shaft position through a window in the knob. According to the basic concept of the invention there is provided a shaft revolution counter which comprises a hollow knob assembly connected to the end of the shaft, a conventional mechanical counter mounted within the knob assembly adjacent a window in the end thereof and stabilized relative to a fixed reference point external of the knob assembly through a planetary or epicyclic gear train, and a crown or ring gear assembly for actuating the mechanical counter upon rotation of the knob.

More specifically, the mechanical counter employed in the shaft revolution counter of the invention is mounted on a follower gear journaled within the knob assembly, the follower gear being coupled to a fixed external reference gear, such as the sun gear of an epicyclic gear train, for example, through a pair of planetary gears which are mounted on opposite ends of a gear shaft journaled in the end of the knob assembly. Consequently, rotation of the knob assembly rotates the planetary gears relative to the instrument shaft whose rotational position is being measured, the epicyclic motion imparted to the external planetary gear by the reference gear being employed by the planetary gear within the knob assembly for maintaining the follower gear and hence the mechanical counter in a stationary position relative to the fixed reference gear.

In the preferred embodiment of the invention herein disclosed the mechanical counter mounted within the knob assembly comprises a plurality of indicia-bearing counter wheels journaled on an associated actuating shaft, the counter wheels being intermittently movable in response to rotation of the actuating shaft through a counter drive pinion gear which meshes with a crown gear fixedly mounted within the knob. The position of the mechanical counter within the knob assembly is such that the indicia-bearing counter wheels are positioned adjacent a window in the end of the knob assembly, a masking element being mounted on the frame of the mechanical counter for masking out all but the indicia representative of the rotational position of the input instrument shaft.

According to still another feature of the invention there is provided a novel locking mechanism which may be employed for locking the instrument shaft and associated knob assembly in any position to which they have preset without imparting rotational movement to the instrument shaft during the locking operation. This is accomplished through the utilization of a locking wedge which when actuated cooperates with a plurality of associated ramps to axially move a rotationally fixed flexible disk into frictional locking engagement with the knob assembly.

It is, therefore, an object of the invention to provide a stabilized direct viewing shaft revolution counter in which the count is visible through a knob connected directly to the shaft.

Another object of the invention is to provide a shaft revolution counter in which the shaft position is represented by a numerical count visually displayed through the knob while still maintaining a direct connection between the knob and the shaft.

A further object of the invention is to provide a shaft revolution counter wherein a mechanical counter for presenting a visual display of the shaft position is stably mounted within a shaft knob assembly by an epicyclic gear train which intercouples the counter to a fixed external reference point.

Still another object of the invention is to provide a novel locking mechanism for frictionally locking the knob of an instrument shaft in the rotational position to which it has been preset.

The novel features which are believed to be characteristic of the invention, both as to its organization and method of operation, together with further objects and advantages thereof, will be better understood from the following description considered in connection with the accompanying drawing in which one embodiment of the invention is illustrated by way of example. It is to be expressly understood, however, that the drawing is for the purpose of illustration and description only, and is not intended as a definition of the limits of the invention.

1 illustrating a particular form of shaft locking device which may be employed with the counter of the invention.

Figure 1:
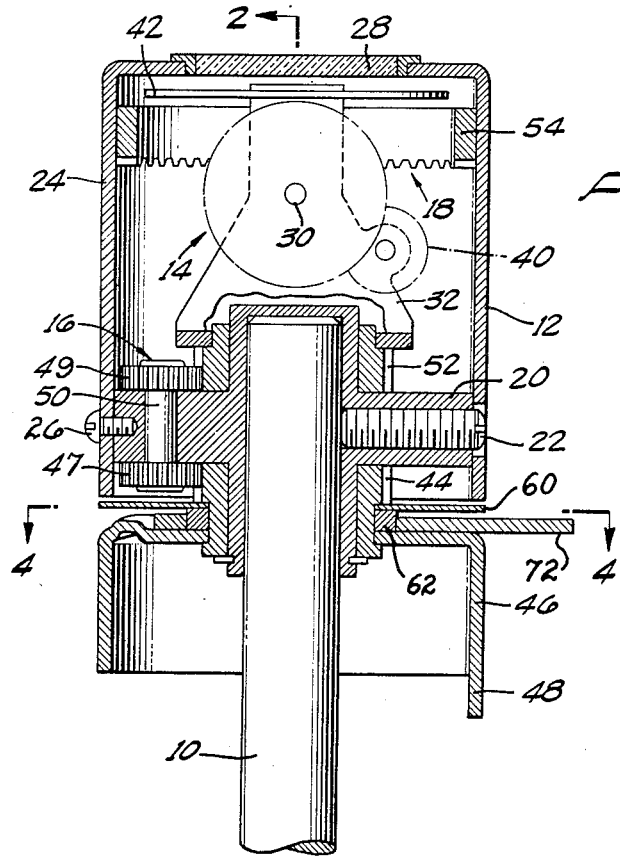
Fig. 1 is an elevational view, partly in section, of the shaft rotation counter of the invention illustrating its basic elements.

With reference now to the drawings, wherein like or corresponding parts are designated by the same reference characters throughout the several views, there is shown in Fig. 1 an elevational view, partly in section, of a shaft rotation counter according to the invention which is operative to visually present a numerical display corresponding to the position of a shaft 10. Basically the shaft revolution counter comprises four principal elements, namely; a hollow housing or knob assembly, generally designated 12, which is rigidly affixed to shaft 10 and is rotatable therewith, a mechanical counter generally designated 14 which is mounted within the knob assembly, a planetary or epicyclic gear train generally designated 16 for maintaining the counter stationary during rotation of housing assembly 12, and a crown gear drive assembly generally designated 18 for actuating the mechanical counter upon rotation of the housing assembly.

In the specific embodiment of the invention shown in Fig. 1, the housing or knob assembly includes an annular base plate 20 which is rigidly attached to shaft 10, as by a set screw 22, and a cylindrical knob 24 which is fastened at one end to the circumferential periphery of base plate 20 by a plurality of fasteners, as exemplified by screw 26. The other end of knob 24 is enclosed by a circular window 28 which may be made of glass or plastic, for example, and which is provided for viewing counter 14.

Figure 2:
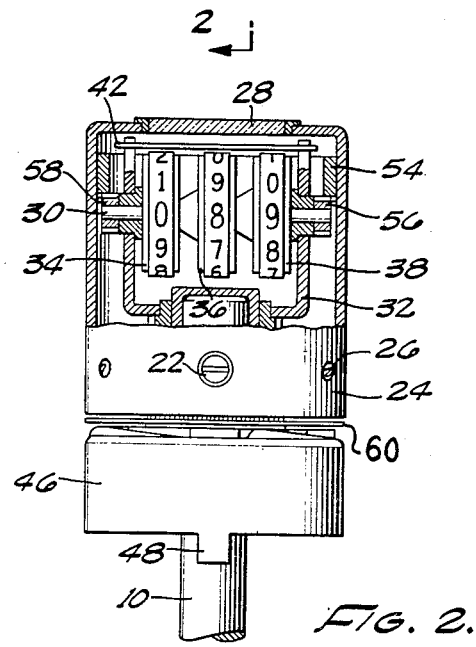
Fig. 2 is a side elevation view, partly in section, of the shaft revolution counter shown in Fig. 1.

Mechanical counter 14 may be any of numerous commercially available mechanical counting mechanisms capable of visually presenting as a numerical display the rotational motion imparted to an associated counter shaft 30. As shown in the drawings, for example, the shaft revolution counter of the invention includes a conventional Veeder-Root counter mechanism which includes a counter mounting bracket 32, and a plurality of counter wheels, such as wheels 34, 36 and 38 in Fig. 2, which are mounted on the associated counter shaft 30. As shown in Fig. 2 the counter wheels preferably have numerical indicia disposed about their periphery.

Figure 3:
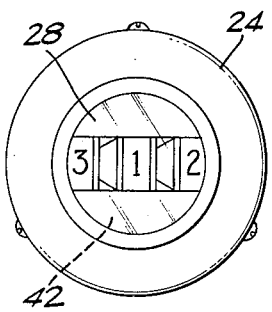
Fig. 3 is a plan view of the shaft revolution counter of the invention showing how the count generated is visually presented.

In addition to the foregoing elements the counter includes one or more counter pinion gears, such as gear 40 in Fig. 1, which are interposed between adjacent counter wheels and which are used for intermittently actuating the higher order counter wheels in response to a predetermined incremental rotational movement of the lower order counter wheels. As shown in Figs. 1 and 2, the counter assembly also includes a masking member 42 which is affixed to the upper end of counter mounting bracket 32 adjacent window 28, the masking member having a rectangular aperture in the center thereof for limiting the field of view through window 28 to the uppermost indicia on the counter wheels, as shown in Fig. 3.

Returning once more to the description of Fig. 1, it will be recalled that planetary gear train 16 is employed for maintaining mechanical counter 14 stationary within the housing assembly so that the numerical display viewed through window 28 remains horizontal during rotation of knob 24. As shown in Fig. 1, the planetary gear system includes a stationary sun gear 44 through which base member 20 is journaled, gear 44 being held stationary by a cup-like member 46 to which the gear is staked, cup 46 in turn including a mounting dog 48 which is held by a slot in an associated equipment frame, not shown.

Meshing with sun gear 44 is a first planetary gear 47 which is intercoupled to a second planetary gear 49 by a shaft 50, this shaft being journaled in base member 20 so that each of planetary gears 47 and 49 describes a complete circle about shaft 10 for each revolution of knob 24. The upper planetary gear in turn meshes with a follower gear 52 which is journaled on an internal hub of base member 20, counter mounting bracket 32 being fixedly mounted to the upper end of gear 52 by either brazing, a keyway, or other suitable fastening device.

It will be recognized now that if the gear ratio between sun gear 44 and planetary gear 47 is identical to the gear ratio between follower gear 52 and planetary gear 49, then gear 52 will be held stationary relative to gear 44 as the housing assembly and shaft are rotated. Consequently the mechanical counter, which is affixed to gear 52, will be held stationary with respect to gear 44 and hence with respect to the equipment frame engaged by mounting dog 48. It is apparent, therefore, that if the shaft revolution counter is mounted to present a horizontal visual display, as shown in Fig. 3 for example, the display will remain horizontal despite rotation of knob 24 and shaft 10.

With reference now to Fig. 2, consideration will be given next to the manner in which the counter is actuated through crown gear assembly 18 to vary the visual display presented through window 28 in accordance with rotation of knob 24. Basically the crown gear assembly includes a crown gear 54 which is brazed or otherwise affixed to the interior surface of knob 24 adjacent its windowed end, and a counter drive pinion 56 which is affixed to counter shaft 30 and which meshes with crown gear 54. In addition the crown gear assembly includes an idler pinion 58 which is journaled on the other end of shaft 30 and which also meshes with crown gear 54, the function of the idler pinion being to distribute symmetrically the forces exerted upon the counter mechanism.

In operation, rotation of knob 24 functions to rotate shaft 10 by virtue of the direct connection therebetween, the "feel" of shaft 10 being transmitted directly to the knob without gear backlash or the like. Simultaneously, the movement of crown gear 54 relative to counter drive pinion 56 functions to rotate counter shaft 30 and hence to incrementally increase or decrease the visual display presented by the counter for each predetermined increment of rotational movement, the direction of change of the count being determined by the direction of rotation of the shaft.

It will be recognized, of course, that the gear ratio between crown gear 54 and counter drive pinion 56 should be selected so that the digits of the count which is visually displayed represent the desired incremental units of shaft rotation. It will also be appreciated that a conventional indicator dial could be employed in conjunction with the shaft revolution counter of the invention to provide a fine measurement of rotational position.

Figure 4:
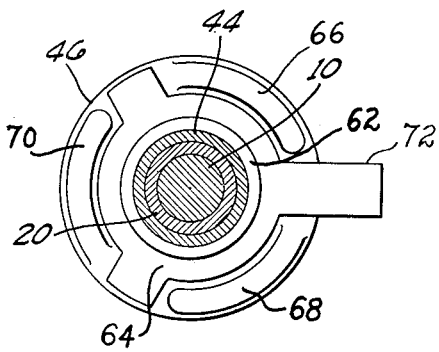
Fig. 4 is a sectional view taken along plane 4—4, in Fig.

With reference now to Figs. 1, 2 and 4 of the drawing, the specific embodiment of the invention therein illustrated includes still another structural feature, namely, a locking mechanism which may be utilized for locking knob 24, and consequently shaft 10, in any desired shaft position. As shown in Fig. 1 the locking mechanism includes a relatively thin flexible disk 60 which is staked or otherwise affixed to gear 44 along with cup member 46, disk 60 having an outside diameter larger than the inside diameter of knob 24, and being spaced from cup 46 by an annular spacer 62. In addition, the locking mechanism includes three inclined ramps embossed in the top of cup member 46 and a three legged locking wedge 64 which is journaled around spacer 62, the normal relationship of the elements when knob 24 is free to rotate being shown in Fig. 4, wherein the embossed ramps are designated 66, 68 and 70, respectively.

In operation, when it is desired to lock knob 24 and shaft 10 in a preset position, arm 72 of wedge 64 is rotated in a clockwise direction so that the legs of the wedge engage and slide up the ramps embossed in cup 46. Continued rotation of wedge 64 then moves the wedge axially upward, as viewed in Fig. 1, and deforms flexible disk 60 until its periphery engages and frictionally locks with the skirt of knob 24, thereby preventing further rotational movement of the knob and its attached shaft. It will be noted that in moving disk 60 into locking engagement with knob 24 no rotational movement can be imparted to the knob owing to the fact that the flexible disk is fixed to gear 44 and then to the equipment frame and is not free to rotate.

It is to be understood, of course, that the specific embodiment of the invention shown in the drawing may be modified in specific details without departing from the spirit and scope of the invention. For example, the mechanical counter could include more than three counter wheels if desired, and the crown gear assembly could be modified to use a planetary level gear assembly. Accordingly it is to be understood that the invention is to be limited only by the spirit and scope of the appended claims.

What is claimed as new is:

1. A shaft revolution counter for counting the number of revolutions of an input shaft, said shaft revolution counter comprising: an annular base plate concentrically mounted on the input shaft adjacent its end; a hollow knob having an open end, said knob being affixed at its open end to the periphery of said base member and having a window in its opposite end whereby said base member and said knob define a chamber which may be viewed through said window; first and second spur gears, said first spur gear being journaled over the input shaft adjacent said base member and external of the chamber defined by said knob and base member; means for constraining said first spur gear to a fixed position independent of rotation of the input shaft; a mechanical counter mounted on said second spur gear, said mechanical counter having a counter shaft and a plurality of indicia-bearing counter wheels responsive to rotation of the counter shaft for indicating the number of incremental angular units of rotation made by said counter shaft; means for journaling said second spur gear concentric with the input shaft and within the chamber defined by said base member and said knob and with said indicia bearing counter wheels adjacent said knob window; first and second planetary gears meshing with said first and second spur gears respectively; a gear shaft journaled in said base plate, said first and second planetary gears being affixed to opposite ends of said gear shaft whereby said mechanical counter is maintained in a fixed position relative to said means for constraining said first spur gear; and means mounted within said knob for rotating said counter shaft in accordance with rotation of the input shaft with respect to said first spur gear whereby a stabilized visual display corresponding to the rotational position of the input shaft is presented through said knob window.

2. The shaft revolution counter defined in claim 1 wherein said last named means includes a crown gear affixed to the interior surface of said knob and a pinion gear in mesh with said crown gear and affixed to said mechanical counter shaft.

3. The shaft revolution counter defined in claim 1 wherein the gear ratio between said first spur gear and said first planetary gear is identical to the gear ratio between said second spur gear and said second planetary gear.

4. A shaft revolution counter for counting the number of revolutions of an instrument shaft, said shaft revolution counter comprising: a hollow knob assembly connected directly to the shaft and rotatable therewith, said knob assembly having a window therein; a mechanical counter having a counter shaft and a plurality of indicia-bearing counter wheels responsive to rotation of the counter shaft for indicating the number of incremental angular units of rotation made thereby; means for mounting said mechanical counter in a stable position within said knob assembly with said counter wheels adjacent said wnidow, said means including a planetary gear train extending through said knob assembly; and means connected to and mounted within said knob assembly for rotating said counter shaft in response to rotation of said knob assembly whereby a visual display of the instrument position is presented through said knob window.

5. A shaft revolution counter for presenting a stabilized visual display representing the rotational position of a shaft, said counter comprising: a hollow knob assembly mounted on the end of the shaft and rotatable therewith, said knob assembly having a viewing aperture therein; a sun gear journaled on the shaft adjacent said knob assembly; means for constraining said sun gear to a fixed rotational position in space; a mechanical counter including a counter drive pinion gear and means for visually displaying a count representative of the number of incremental angular units of rotation made by said drive pinion gear; means including a planetary gear train for mounting said counter within said knob assembly and in a fixed position relative to said sun gear; and means responsive to rotational movement of said knob assembly for imparting a rotational movement to said counter drive pinion gear.

6. The shaft revolution counter defined in claim 5 wherein said last named means comprises a crown gear fixed to the interior of said knob assembly and in mesh with said counter drive pinion gear.

7. The shaft revolution counter defined in claim 4 which further includes a locking mechanism for locking the shaft in any desired rotational position to which it has been preset, said locking mechanism including an annular flexible disk positioned over the shaft, means for mounting said disk adjacent said knob assembly and in a fixed position relative to said sun gear, a frame member positioned adjacent said disk and having a plurality of inclined ramps thereon, and a locking wedge journaled over said shaft between said frame member and said disk, said locking wedge having a plurality of evenly spaced legs extending therefrom corresponding to the ramps on said frame member whereby rotation of said legs of said locking wedge relative to said sun gear axially forces said locking wedge into engagement with said flexible disk and said flexible disk into frictional engagement with said knob assembly.

8. A shaft revolution counter for presenting through a window in a hollow knob connected directly to the end of the shaft a stabilized visual display representative of the rotational position of the shaft, said revolution counter comprising: a mechanical counter comprising a counter drive pinion and display means for presenting a visual display representative of the accumulated rotation of the drive pinion; an epicyclic gear system for mounting said counter within the knob and in a stable position with respect to a fixed reference point external of the knob, said display means of said counter being positioned adjacent the window in the knob; and gear means mounted within the knob and meshing with said counter drive pinion for rotating said counter drive pinion in response to rotation of the knob relative to said mechanical counter.

9. A shaft revolution counter for presenting through a window in a hollow knob connected directly to the end of the shaft a stabilized visual display representative of the rotational position of the shaft, said revolution counter comprising: a mechanical counter comprising a counter drive pinion and display means for presenting a visual display representative of the accumulated rotation of the drive pinion; an epicyclic gear system for mounting said counter within the knob and in a stable position with respect to a fixed reference point external of the knob, said epicyclic gear system including a follower gear fixedly attached to said counter and journaled within the hollow knob concentric with the shaft, an external reference gear mounted concentric with the shaft and fixed with respect to said reference point, first and second planetary gears meshing with said follower gear and said external reference gear, respectively, and a gear shaft journaled in the knob and rigidly interconnecting said planetary gears; and an annular drive gear mounted on the interior wall of the knob in mesh with said counter drive pinion for rotating said counter drive pinion in response to rotation of the knob relative to said mechanical counter.

References Cited in the file of this patent
UNITED STATES PATENTS 2,119,596  Goldstine _____ June 7, 1938